June 11, 1963 R. H. RECTOR 3,093,515
BATTERY CASE
Filed May 31, 1960 3 Sheets-Sheet 1
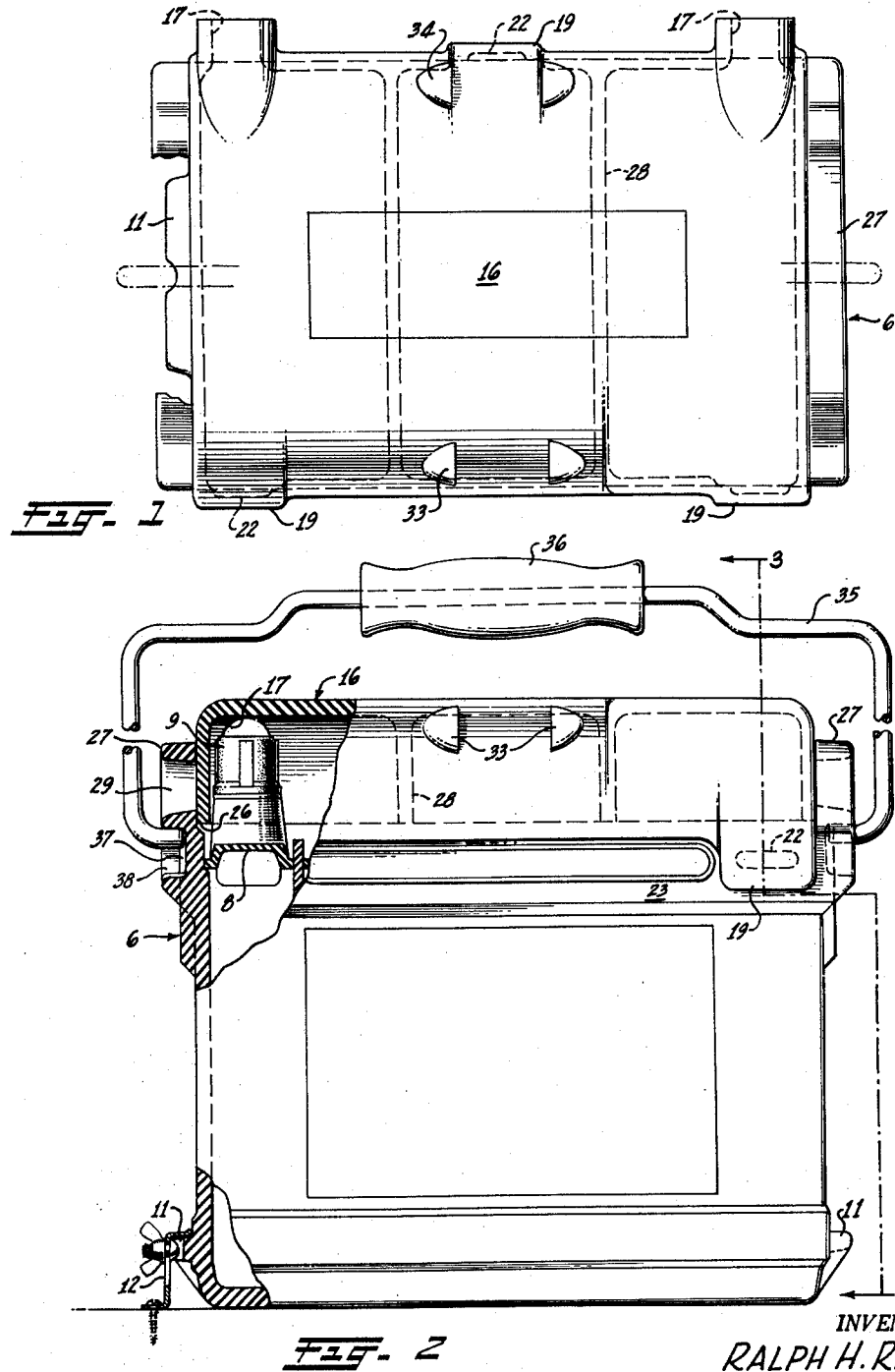
INVENTOR:
RALPH H. RECTOR
BY
His ATTORNEYS.

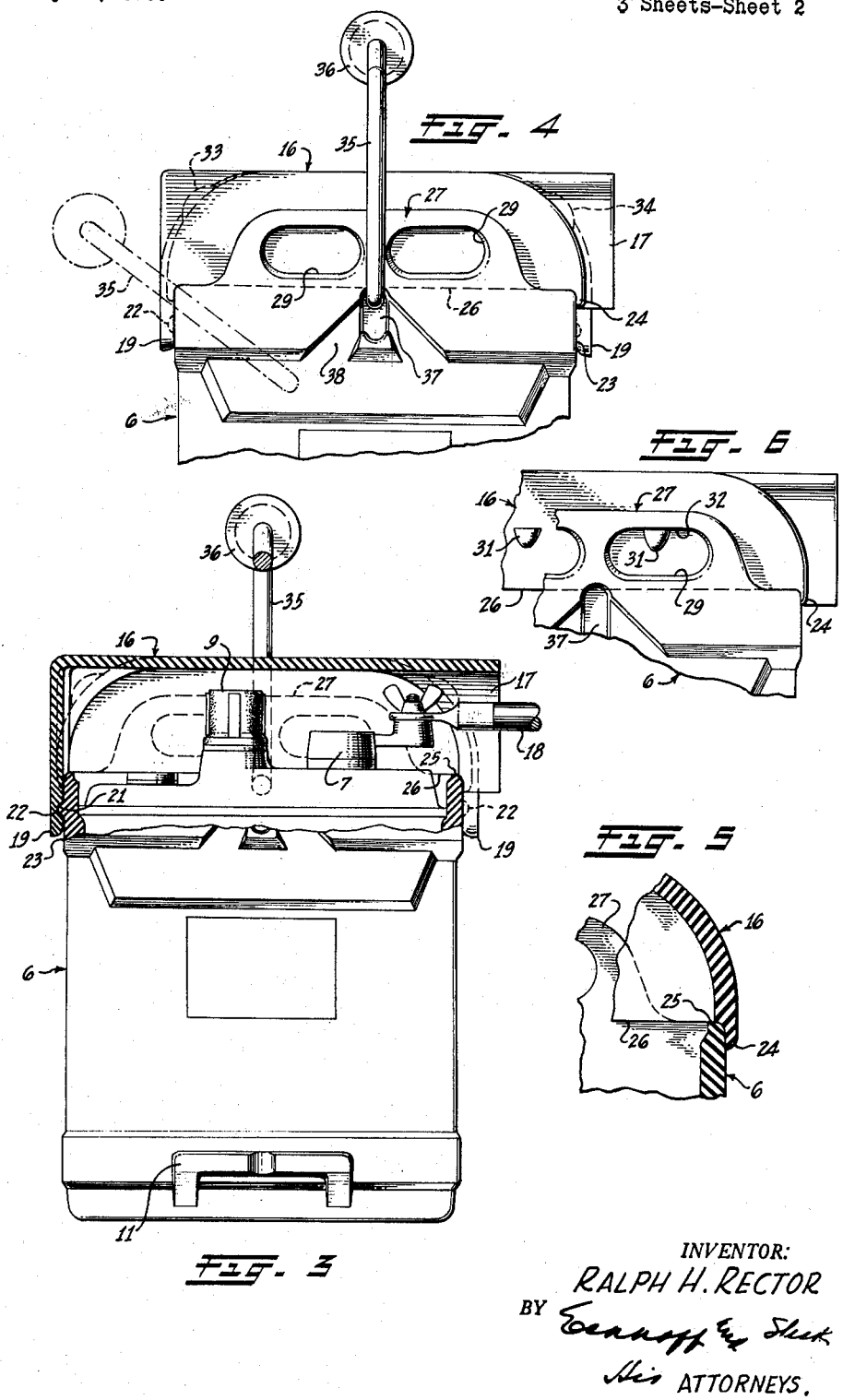

June 11, 1963 R. H. RECTOR 3,093,515
BATTERY CASE
Filed May 31, 1960 3 Sheets-Sheet 3
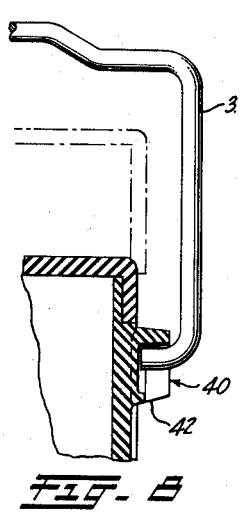
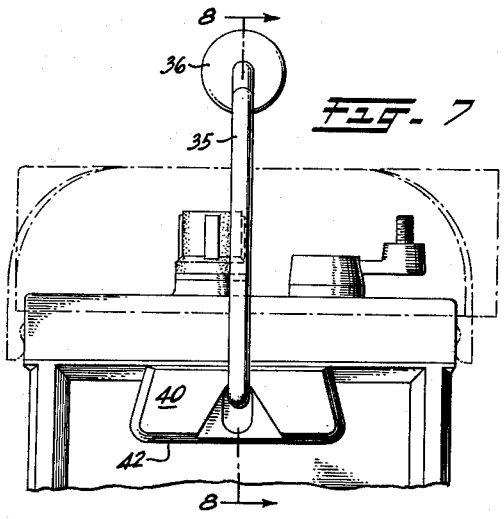
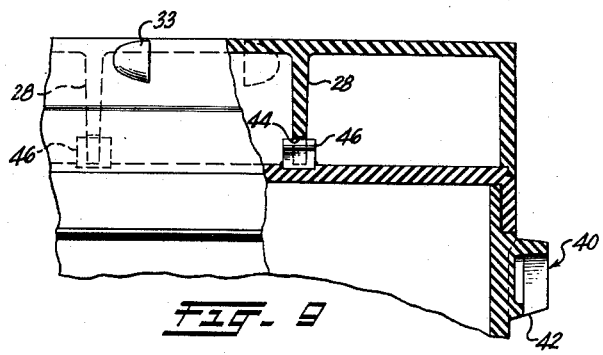
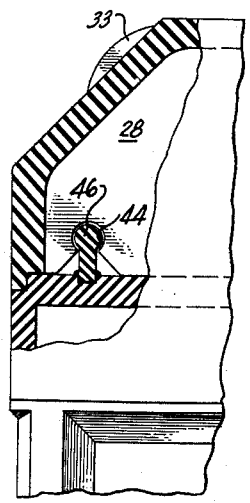
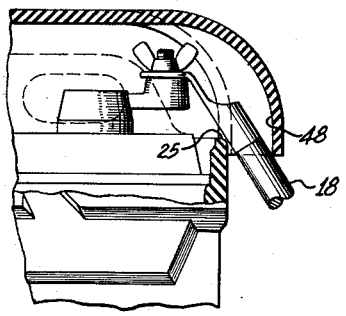
INVENTOR:
RALPH H. RECTOR
BY
*His* ATTORNEYS 3,093,515
BATTERY CASE
Ralph H. Rector, Whittier, Calif., assignor to Stauffer Chemical Company, a corporation of Delaware
Filed May 31, 1960, Ser. No. 32,721
1 Claim. (Cl. 136—166)

This invention relates to an improved construction for a wet cell storage battery. The invention relates further and more particularly to construction of such a battery which is intended to be subject to relatively severe conditions in use, such as are encountered in marine service.

It is in general the broad object of the present invention to provide an improved wet cell storage battery for marine use.

A further object of the present invention is to provide a novel storage battery construction in which the battery is protected against the elements.

A further object of the present invention is to provide a battery construction such that the battery may be readily handled.

The invention includes other objects and features of advantage, some of which, together with the foregoing, will appear hereinafter wherein the present preferred form of the storage battery construction is disclosed.

In the drawings accompanying and forming a part hereof,

FIGURE 1 is a plan view of the assembled battery.
FIGURE 2 is a side elevation partly in section.
FIGURE 3 is a section taken along the line 3—3 in FIGURE 2.
FIGURE 4 is a fragmentary end view showing how the handle can be installed and removed.
FIGURE 5 is a fragmentary section showing in detail the fit between the battery case and cover.
FIGURE 6 is a fragmentary end elevation, partly broken away to illustrate a modified form of construction.
FIGURE 7 is a fragmentary end elevation of an alternative structure omitting the finger holes of the structure FIGURE 4 and substituting therefor alternative gripping means.
FIGURE 8 is a fragmentary section through the line 8—8 of FIGURE 7.
FIGURE 9 is a fragmentary side elevation, partially in section, showing an alternative means for securing the top in place on the battery case.
FIGURE 10 is a fragmentary end elevation, partially in section, further illustrating the means of FIGURE 9 for securing the cover in place.
FIGURE 11 is a fragmentary end elevation particularly showing a modified cover having a port thereon which requires that the cable be dressed downwardly as it is led away from the battery terminal.

Referring to the drawings, the storage battery of the present invention includes a generally rectangular case indicated at 6 which provides a container for a conventional storage battery, particularly one having spaced lead plates immersed in a sulfuric acid electrolyte. The battery includes the terminals 7 at opposite ends thereof with a plurality of individual cells connected together electrically. Each cell includes a filling vent generally indicated at 8, the vent being closed by a removable cap 9 permitting the addition of an electrolyte and inspection of the condition of the electrolyte as with a hydrometer in a well known manner. Each end of the battery includes a projection 11 adjacent the bottom thereof adapted to be engaged as by the hold down clamp generally indicated at 12. The clamp is affixed to some permanent support so that the battery is secured in position.

In accordance with this invention, a removable cover 16 is provided upon the battery. The cover includes spaced ports 17 through which cables 18 connected to each of the terminals 7 are led to the exterior of the battery.

A number of integrally formed projecting lugs 19 extend downwardly from the two sides of the cover 16. Each of these lugs 19 is provided with a groove 21 which mates with a cooperating protuberance 22 formed upon the outer surface of the rim 23 of the case 6 to retain the cover securely in position. The sides of the cover 16 are also molded to include a depending lip 24 which overlaps the top edge 25 of case 6, as shown in FIGURE 5. The outside bottom edge 26 of each end of cover 16 abuts the inner surface of an upstanding extension 27 at each end of the battery. As can be seen, this construction provides a substantially water-tight cover for the planar top of the battery. Reinforcing ribs 28 are molded into cover 16 to increase its rigidity and thus augment its sealing qualities. Extensions 27 are each provided with a pair of finger holes 29 to facilitate handling of the case.

A modified method of retaining the cover in position is illustrated in FIGURE 6 wherein pairs of locking ears 31 are integrally formed in the opposite ends of the cover. Ears 31 are adapted to fit within and engage the underside 32 of finger holes 29 in extensions 27 for interlocking the cover and case. The cover is removed by springing the opposite ends of the cover slightly to release the ears from engagement with the finger holes 29. In this construction, the depending lugs 19 may be omitted.

Pairs of spaced guide elements 33 and 34 are centrally located on transversely opposing sides of the cover 16 to provide for a strap, if desired, which may be passed about the battery between these guides to secure the cover positively in place and to hold the batery additionally in position.

To facilitate movement of the battery, a handle or bail 35 is provided, including a grip portion 36. The lower ends of the bail are bent inwardly toward one another and are adapted to fit within a vertical groove 37 provided in an end of the battery. The bail may be readily removed by springing an end out of engagement with the groove 37 and then moving the end downwardly through one of the passageways 38 provided on opposite sides of the groove 37 to form an inverted V.

FIGURES 7 and 8 show alternative structures wherein the finger holes 29 of FIGURES 4 and 6 are eliminated. Instead, the outstanding block 40 is of sufficient depth that the fingers may be placed beneath ledge 42 and the battery case lifted.

An alternative method of securing the cover to the battery case is disclosed in FIGURES 9 and 10. The ribs 28, shown in phantom view in FIGURES 1 and 2, are modified somewhat so as to include a key hole 44, as shown in FIGURE 10. Key 46 is fixedly secured to the upper surface of the battery and, because of the generally resilient and flexible nature of the material from which the reinforcing ribs 28 are formed, the key may be forced into the key hole from the bottom so as to provide means for temporarily securing the cover in place.

Still another cover modification is shown in FIGURE 11 wherein, in place of the horizontally extending port 17 of FIGURES 1 and 3, there is provided a downward curvature of the cover material so as to provide port 48 which serves as a downwardly extending conduit for cable 18. With this embodiment, either of the methods described earlier for affixing the cover to the battery case may be employed. This structure provides additional protection for the battery terminals as it is more difficult for foreign matter to enter the shielded port 48 than the horizontal ports 17.

Any of the covers described previously may be fitted with a maintenance charger within the cover in the area of protrusion 19 of FIGURE 1.

Each of the battery cases and covers described above may be formed of conventional stiff rubber material of the type customarily used in the manufacture of marine batteries, or of a plastic or resin-rubber mixture, varieties of which are available for use in such applications. Obviously, it would be possible to manufacture the case and cover of a colored plastic if desired.

From the foregoing I believe it will be apparent that I have provided a novel, simple and improved storage battery construction, particularly one that is intended for marine use. It will be noted that the cover fits snugly on the battery and that the latter is thus protected against accidental contact as with sea water which might possibly come in contact with the battery if the cover were not provided.

I claim:

In a wet cell storage battery having a generally rectangular case and a top planar surface with exposed terminals, the improvements comprising:

(a) integral flanges extending upwardly from either end of the said rectangular base, each of the said flanges having a pair of laterally spaced finger holes therein passing entirely through the said upwardly extending flanges;

(b) a one piece molded protective cover constructed solely of a material selected from the class consisting of stiff rubber, plastic and a resin-rubber mixture, said cover having outlets therefrom for electrical cables attached to the said terminals;

(c) and means for removably securing said cover over said top planar surface of the said rectangular base, said means consisting of four ears, two on either end thereof, molded as a part of the said cover and of the same material, said ears being so positioned on said cover that one of said ears is capable of registry with each of the said finger holes of said upwardly extending flanges when the cover is positioned over the said top planar surface of the said rectangular case.

References Cited in the file of this patent

UNITED STATES PATENTS

| | | |
|---|---|---|
| 1,271,692 | Ford | July 9, 1918 |
| 1,355,050 | Kimball | Oct. 5, 1920 |
| 1,733,878 | Holland | Oct. 29, 1929 |
| 2,197,193 | Pontis | Apr. 16, 1940 |
| 2,303,622 | Duncan | Dec. 1, 1942 |

FOREIGN PATENTS

| | | |
|---|---|---|
| 582,586 | France | Oct. 17, 1924 |